US011279159B2

(12) United States Patent
Yaacobov et al.

(10) Patent No.: US 11,279,159 B2
(45) Date of Patent: Mar. 22, 2022

(54) DETERMINING CLEANING FLUID FLOW AT A PRINT APPARATUS

(71) Applicant: HEWLETT-PACKARD DEVELOPMENT COMPANY, L.P., Spring, TX (US)

(72) Inventors: Yossi Yaacobov, Ness Ziona (IL); Michel Assenheimer, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,519

(22) PCT Filed: Jun. 15, 2018

(86) PCT No.: PCT/US2018/037715
§ 371 (c)(1),
(2) Date: Oct. 16, 2019

(87) PCT Pub. No.: WO2019/240807
PCT Pub. Date: Dec. 19, 2019

(65) Prior Publication Data
US 2021/0331500 A1 Oct. 28, 2021

(51) Int. Cl.
*B41J 29/17* (2006.01)
*G01F 3/00* (2006.01)
(52) U.S. Cl.
CPC ............... *B41J 29/17* (2013.01); *G01F 3/00* (2013.01)
(58) Field of Classification Search
CPC ..................................................... B41J 29/17
See application file for complete search history.

(56) References Cited

U.S. PATENT DOCUMENTS

| 6,234,002 | B1 | 5/2001 | Sisney et al. |
| 7,654,127 | B2 | 2/2010 | Krulevitch et al. |
| 8,833,177 | B2 | 9/2014 | McDaniel et al. |
| 9,207,109 | B2 | 12/2015 | Milley et al. |
| 9,422,146 | B2 | 8/2016 | Rogers et al. |
| 9,797,765 | B2 | 10/2017 | Nagai |
| 9,895,041 | B2 | 2/2018 | Balas et al. |
| 2003/0007031 | A1 | 1/2003 | Sugiyama |
| 2005/0058548 | A1 | 3/2005 | Thomas et al. |

(Continued)

FOREIGN PATENT DOCUMENTS

CN 104290461 B * 7/2017 .......... B41J 11/0015
EP 3021649 A1 5/2016

(Continued)

OTHER PUBLICATIONS

Chappel, J M, MachineTranslationofCN-104290461-B, 2017 (Year: 2017).*
Chappell, MachineTranslationofCN-104290461-B, 2017 (Year: 2017).*

*Primary Examiner* — Scott A Richmond
(74) *Attorney, Agent, or Firm* — Dierker & Kavanaugh PC

(57) ABSTRACT

In one example, a method comprises measuring, by a processor, the flow rate of a cleaning fluid to clean at least a portion of a printing apparatus. The measured flow rate is compared to a desired flow rate. When the measured flow rate is outside of a first deviation from the desired flow rate, but within a second deviation from the desired flow rate, then the method in this example comprises changing the operation of a component of a printing apparatus.

11 Claims, 5 Drawing Sheets

(56) References Cited

U.S. PATENT DOCUMENTS

| | | |
|---|---|---|
| 2006/0226084 A1 | 10/2006 | Gross |
| 2008/0218554 A1 | 9/2008 | Inoue |
| 2010/0321425 A1 | 12/2010 | Kanke et al. |
| 2012/0206515 A1* | 8/2012 | Walker .................... B41J 2/175 347/6 |
| 2014/0292915 A1 | 10/2014 | Onodera et al. |
| 2015/0210062 A1 | 7/2015 | Shifley et al. |
| 2017/0343402 A1 | 11/2017 | Takijiri et al. |

FOREIGN PATENT DOCUMENTS

| | | |
|---|---|---|
| JP | 2003-320674 A | 11/2003 |
| JP | 2009-195776 A | 9/2009 |
| JP | 5133438 B2 | 1/2013 |

* cited by examiner

DETERMINING CLEANING FLUID FLOW AT A PRINT APPARATUS

BACKGROUND

Print apparatuses may include cleaning stations that use cleaning fluid to clean a print component (e.g. by removing any residual, non-transferred, printing fluid or print agent, such as an ink).

BRIEF DESCRIPTION OF DRAWINGS

Examples will now be described, by way of non-limiting example, with reference to the accompanying drawings, in which.

DETAILED DESCRIPTION

Print apparatuses may include a photoreceptor and a writing module to write a latent image on to a photoreceptor (e.g. a printing imaging plate). For example, the photoreceptor may be uniformly charged and then areas may be selectively discharged to create the latent image on the photoreceptor. The photoreceptor may then be inked (for example by engaging a binary ink developer to ink an area of the photoreceptor containing the latent image) to develop a charged inked image on the discharged area of the photoreceptor. Excess ink may be returned to an ink reservoir. The inked image may then be transferred to a blanket where it may be heated prior to a final transfer to a printable medium.

Print apparatuses may include a cleaning station. After the inked image is transferred to the blanket, the cleaning station may supply a cleaning fluid (for example an isopar or parafin oil) to photoreceptor which may cool the photoreceptor and clean the photoreceptor by cleaning off any residual ink that was not transferred to the blanket.

In some examples, there is a desired flow rate value (or range of values) for the cleaning fluid, and printing with a non-desired flow rate could be detrimental to the final print quality and/or to the lifespan of the photoreceptor. Cleaning uniformity of the photoreceptor may also be affected by using cleaning fluid dispensed at a non-desired flow rate.

In some examples set out below a measure of deviation from a desired flow rate or range of flow rates is measured, and for deviations that may be corrected for without significantly affecting the print quality consistency a correction to the cleaning fluid flow rate may be accomplished by adjusting a parameter that affects the flow rate. In such examples, for deviations that are judged to be large an alert is issued since for these deviations any attempt to correct them may affect the quality of a print operation (e.g. an output thereof) and/or damage the press operation (e.g. a component of a printing apparatus).

Figure 1:
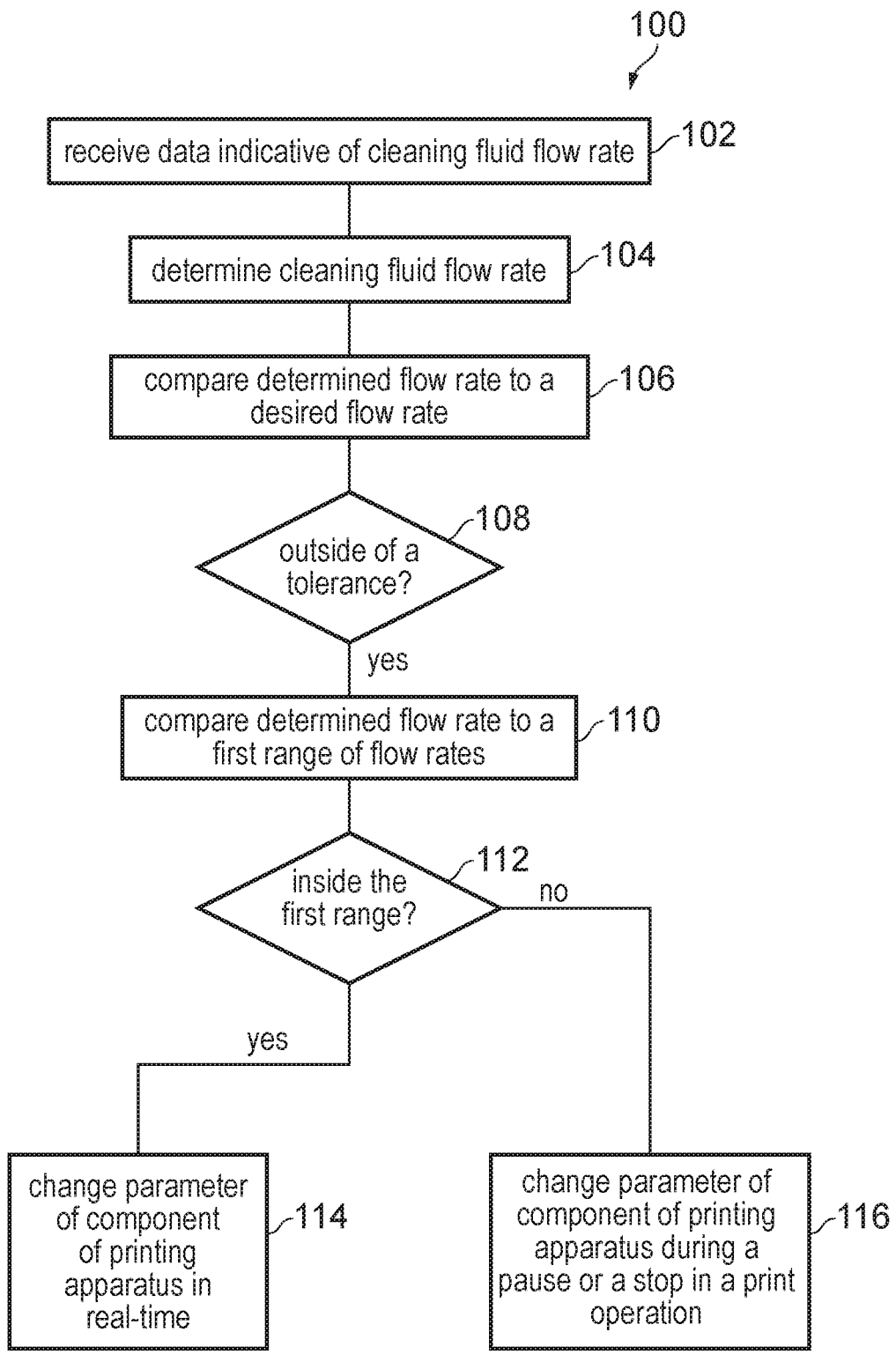
FIG. 1 is a flowchart of an example method.

FIG. 1 is an example method 100, which may be a computer implemented method, and which may be a method for adjusting (or correcting) the flow rate of a cleaning fluid in a print apparatus, or a method for monitoring the flow rate of a cleaning fluid in a print apparatus. Method 100 may be performed during a print operation.

The method 100 comprises, at block 102, receiving data indicative of cleaning fluid flow at a print apparatus. A print apparatus may comprise a cleaning module, or a cleaning station, and the data may be indicative of cleaning fluid flow through, or metered by, the cleaning module or cleaning station. In one example the data may be collected by at least one sensor, for example a flow meter (e.g. an ultrasonic flowmeter). In one example, cleaning fluid may be discharged by a cleaning fluid pump and the data may be collected at, and transferred from, a flow meter provided at or about the cleaning fluid pump (e.g. in a fluid path downstream from the cleaning fluid pump).

In block 104, the method comprises determining a cleaning fluid flow rate based on the received data. Once the cleaning fluid flow rate has been determined it may then be assessed whether the cleaning fluid is flowing at an acceptable rate, and, in some examples below, if not, the extent to which the flow rate deviates from an acceptable rate may be determined and a print operation may be adjusted accordingly. For example, in some examples below once it is established that the cleaning fluid is not flowing at an acceptable rate it may then be established if the cleaning fluid flow rate is (i) nevertheless small enough to be adjusted in real-time, or on-the-fly, during a printing operation; (ii) small enough that printing can continue but large enough that a correction to the flow rate should not take place during a printing operation, for example printing should be paused before such a correction to the flow rate; and (iii) large enough so that printing should not be allowed to continue and no attempt to correct the flow rate should be made during printing, for example a printing operation should be halted or automatically stopped. Stopping a print operation may comprise terminating or halting, permanently, or semi-permanently, an already underway print job. Accordingly, a pause in the print operation may comprise a stop or halt in the print operation. For example, the pause may comprise a pause in an already underway printing job—for example the method 100 may comprise, at block 116 pausing or stopping a print operation. In one example the pause may be an end of a print job with no additional print jobs being queued. In another example the pause may be the end of a print job within a print queue, e.g. a continuous print queue. In one example block 116 may comprise stopping the print operation which may be induced automatically by a printing apparatus or by an operator (e.g. in response to an issued signal). Accordingly, in one example, block 116 may comprise otherwise changing a parameter of a component of the printing apparatus during a pause or a stop in a print operation to cause the cleaning fluid flow rate to approach the desired flow rate. In such an example block 116 may comprise pausing or stopping a print operation.

In block 106, the method comprises comparing the determined flow rate to a desired flow rate. In block 108 it is determined whether the determined flow rate is outside of a tolerance of the desired flow rate. Hence, in one example, at block 108 it may be determined if the cleaning fluid is flowing at an acceptable flow rate. In one example the tolerance may be non-zero in which case block 108 may determine whether the cleaning fluid is flowing at a value within an acceptable range of flow rates. In one example the tolerance may be zero. The tolerance may be symmetric, or asymmetric about the desired value for the flow rate. The tolerance may therefore represent a range of acceptable values containing the desired flow rate.

If it is determined, at block 108, that the cleaning fluid is flowing within the tolerance (i.e. not outside of the tolerance and therefore at an acceptable value) then a printing operating may continue. For example, a printing operation may be allowed to proceed without any intervention (e.g. automatic intervention).

If it is determined, at block 108, that the cleaning fluid is flowing outside of the tolerance, e.g. if the cleaning fluid flow rate is outside of the tolerance, then at block 110, the method comprises comparing the determined flow rate to a first range of flow rates. In block 112, it is determined whether the cleaning fluid flow rate is inside of the first range of flow rates. The first range of flow rates may be symmetric, or asymmetric, about the desired flow rate or about the tolerance of the desired flow rate.

Having been established, at block 108 that the cleaning fluid flow rate is not desired, or acceptable, the extent to which the cleaning fluid flow rate deviates from a desired or acceptable level may be determined. For example, determining whether the cleaning fluid flow rate is within the first range of flow rates may determine (by establishing whether the flow rate is within or outside of this range) the extent of deviation from the desired flow rate. This may determine whether or not intervention to correct the flow rate is possible during a print operation without significantly affecting the operation itself (e.g. print quality or a component of a print apparatus).

If, at block 112, it is determined that the cleaning fluid flow rate is inside of the first range of flow rates then the method comprises, at block 114, changing a parameter of a component of the printing apparatus, in real-time, to cause the cleaning fluid flow rate to approach the desired flow rate. Changing the parameter, at block 112, may, in one example, comprise changing the parameter based on at least one of: a calibration curve, a look-up table, or a series of incremental changes to the parameter over a given time period. Changing the parameter, at block 112, may comprise determining, using a look-up table, a new parameter value and setting the parameter to the new value.

If it is determined, at block 112, that the cleaning fluid flow rate is inside of the first range of flow rates then the cleaning fluid flow rate, although outside of the tolerance of the desired flow rate, has not deviated significantly enough for the flow rate not to be corrected in real-time. Accordingly, at block 114 the method comprises correcting the flow rate in real-time, e.g. in real-time during a print operation. Such deviations from the desired flow rate (e.g. deviations within the first range of flow rates) may be corrected during printing. For such deviations the print quality consistency may not be affected significantly during printing by allowing a print operation to continue and/or by correcting the flow rate during a print operation.

If it is determined, at block 114, that the cleaning fluid flow rate is not inside of the first range of flow rates (e.g. is outside) then the method comprise, at block 116, changing a parameter of a component of the printing apparatus during a pause or a stop in the print operation to cause the cleaning fluid flow rate to approach the desired flow rate. Accordingly, block 116 may comprise pausing or stopping a print operation.

In one example, deviations outside of the first range of flow rates may represent flow rates such that a correction in real-time (e.g. during a print operation) may significantly affect the print quality during a print operation. Accordingly, in such examples, the print operation may be paused and then the flow rate may be corrected. In such an example, the adjustment or correction to the flow rate (by changing the parameter) may be completed prior to resuming the print operation from the pause. In some examples set out below, a cleaning fluid flow rate outside of the first range of flow rates may be further categorised. In such examples, it may be determined whether the print operation should be stopped. For example, although the cleaning fluid flow rate is outside of the first range of flow rates, for "less serious" deviations the flow rate may be corrected at the next available opportunity when a print job has finished. In this example, although the flow rate, being outside of the first range of flow rates, may not be corrected in real-time without affecting print quality consistency, a printing operation may be allowed to continue without significant detrimental impact. Accordingly, in this example, the flow rate may be corrected for (by changing a parameter of a component of the printing apparatus) at a pause in the print operation, e.g. when a job has concluded. On the other hand, if the deviation is "more serious" a print operation may be forced to stop.

At block 114, changing a parameter of a component of the printing apparatus may be to cause the cleaning fluid flow rate to be within the tolerance of the desired flow rate. In one example, therefore, changing the parameter may be to cause the fluid flow rate to approach the desired value but not be within the tolerance. In another example, changing the parameter may be to cause the fluid flow rate to be within the tolerance.

In one example, the desired rate of flow may be a nominal target flow rate. In one example, the first range of flow rates may be a symmetrical or asymmetrical range about a nominal target flow rate.

In one example, the desired rate of flow may be 8 Litres/minute (L/min) and the tolerance may be ±0.4. In this example the tolerance may therefore be the range (7.6, 8.4) L/min. Therefore, if the determined cleaning fluid flow rate is within the range (7.6, 8.4) then it may be determined that the flow rate is within the tolerance.

In one example, the first range of values may be (7.5, 8.6) L/min. In another example, the first range of values may be (6, 10) L/min. In such examples if the flow rate is determined to be outside of the tolerance range, it may be determined whether the flow rate is outside or within these ranges. If the flow rate is determined to be inside these ranges then the flow rate may be corrected for, by adjusting a parameter as above, in real-time during a print operation.

In one example the ranges may include their endpoints.

Figure 2:
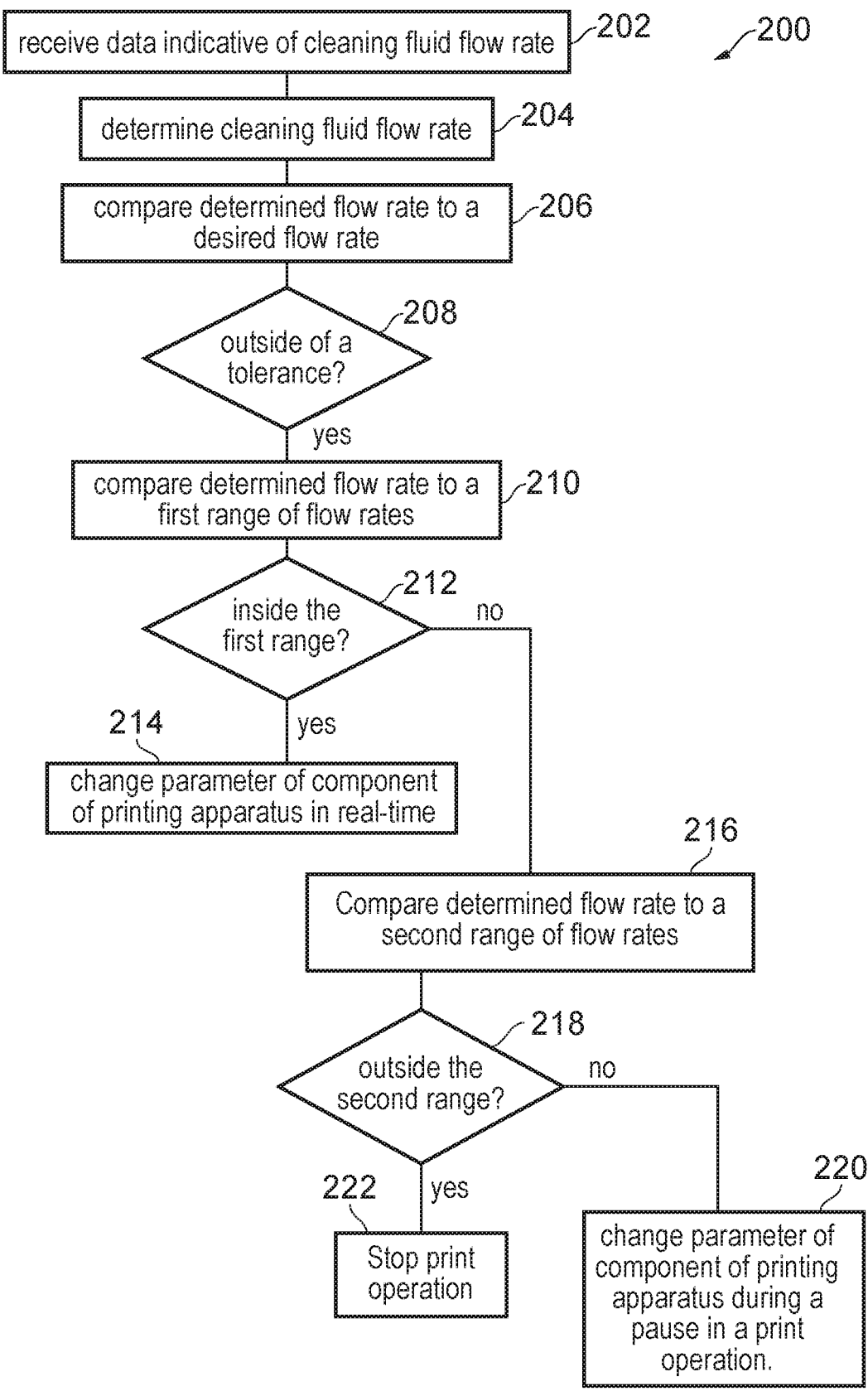
FIG. 2 is a flowchart of an example method.

FIG. 2 is an example method 200, which may be a computer implemented method, and which may be a method for adjusting (or correcting) the flow rate of a cleaning fluid in a print apparatus, or a method for monitoring the flow rate of a cleaning fluid in a print apparatus. Method 200 may be performed during a print operation.

Blocks 202-214 of the method 200 are as for blocks 102-114 of the method 100 as set out in the example of FIG. 1 above.

In block 214, if it is determined that the cleaning fluid flow rate is not inside of the first range of flow rates (e.g. is outside) then the method 200 comprises, at block 216, comparing the desired flow rate to a second range of flow rates. The first range of flow rates is a subset of the second range of flow rates. In one example, the second range of flow rates may contain the first range of flow rates (e.g. either including or excluding at least one of the first range's endpoints). Therefore, the second range may represent a broader range of values than the first range of flow rates. The second range of flow rates may be asymmetric, or symmetric, about the desired flow rate or tolerance of the desired flow rate. The second range of flow rates may be asymmetric, or symmetric, about the first range of flow rates. Therefore, in one example at least one of the tolerance, first range, and second range of flow rates may be asymmetric or symmetric about the desired flow rate. In one example they may be independently and separately asymmetrical about the desired flow rate (e.g. each may be asymmetric exhibiting different asymmetry).

Accordingly, having been determined, at block 108 that the cleaning fluid flow rate is not within a tolerance of a desired value, and is not within a first range of flow rates (which may be considered a range of flow rates that could be corrected for in real-time during a print operation), the extent of the flow rate's deviation from a desired value may be further determined and/or categorised.

At block 218 the method comprises determining whether the cleaning fluid flow rate is outside of the second range of flow rates. If it is determined that the flow rate is not outside of the second range of flow rates (e.g. is within the second range of flow rates) then the method may comprise changing the parameter of a component of a print apparatus during a pause in a print operation to cause the cleaning fluid flow rate to approach the desired flow rate. This may comprise, at block 220, calibrating the cleaning fluid flow rate.

If, at block 218, it is determined that the cleaning fluid flow rate is outside of the second range of flow rates then the method comprises, at block 222, stopping a print operation. The method may comprise changing the parameter of a component of a print apparatus during a pause in a print operation (e.g. during the stop of the print operation) to cause the cleaning fluid flow rate to approach the desired flow rate.

Therefore, the method 200, may further categorise the severity of the deviation of the flow rate of cleaning fluid from a desired value. For example, having been established that the cleaning fluid flow rate is outside of the first range of valves, if the flow rate is within the second range of flow rates then the deviation from the desired value may be considered "medium". Such deviations may be small enough to allow printing to proceed in the short-term without significant detrimental impact (e.g. to components of a print apparatus and/or to print quality consistency). At the next available opportunity, e.g. at a pause in a print operation, for example the next "GetReady", such deviations may be corrected for and (e.g. at block 220) the flow rate may be calibrated. On the other hand, if the flow rate is outside of the second range of flow rates then the deviation may be considered "large". In this example, such deviations should not be corrected for (since corrections may affect the print quality consistency or the performance of the print apparatus) and for such deviations the method comprises, at block 222, stopping the print operation.

Changing the parameter of a component of a print apparatus may comprise changing the parameter of a component of a print apparatus to cause the flow rate to be within the tolerance of the desired flow rate.

Changing the parameter of a component of a print apparatus may comprise changing the parameter when a print operation has been stopped (e.g. following block 222). Accordingly, method 200 may comprise, after block 222, changing the parameter of a component of a print apparatus during a pause in a print operation to cause the cleaning fluid flow rate to approach the desired flow rate. In one example, block 220 comprises changing the parameter of a component of a print apparatus during a pause in a print operation to cause the cleaning fluid flow rate to approach the desired flow rate.

In one example, block 220 comprises changing a component of a printing apparatus during a pause in a print operation. Block 220 may comprise calibrating the cleaning fluid flow rate during a pause in a print operation, for example at the next "GetReady" sequence, in which a print apparatus may be prior to performing a print job.

In one example, the desired rate of flow may be a nominal target flow rate. In one example, at least one of the first range of flow rates and second range of flow rates may be a symmetrical or asymmetrical range about a nominal target flow rate.

In one example, the desired rate of flow may be 8 Litres/minute (L/min) and the tolerance may be ±0.4. In this example the tolerance may therefore be the range (7.6, 8) L/min. Therefore, if the determined cleaning fluid flow rate is within the range (7.6, 8.4) then it may be determined that the flow rate is within the tolerance.

In one example, the first range of values may be (7.5, 8.6) L/min. In another example, the first range of values may be (6, 10) L/min. In such examples if the flow rate is determined to be outside of the tolerance range, it may be determined whether the flow rate is outside or within these ranges. If the flow rate is determined to be inside these ranges then the flow rate may be corrected for, by adjusting a parameter as above, in real-time during a print operation.

In one example, the second range of values may be (5.9, 10.1) L/min. In this example if the flow rate is determined to be outside of the first range of values then it may be determined if the flow rate is inside or outside of this second range of values, e.g. inside or outside of the range (5.9, 10.1). If inside, then the method may comprise pausing a print operation and changing a parameter of a component of a print apparatus and/or calibrating a pump to affect the cleaning fluid flow rate. If outside, then the method may comprise stopping a print operation.

In one example the ranges may include their endpoints.

Changing a parameter of a component of the printing apparatus may comprise changing a parameter of a cleaning fluid pump. In one example, the cleaning fluid pump may be to meter cleaning fluid to a cleaning station. In another example, the cleaning fluid pump may meter fluid directly to the photoreceptor to clean and/or cool the photoreceptor. The parameter may be a cleaning fluid pump voltage. Changing a parameter of a component of the printing apparatus may, in one example, comprise consulting a look-up-table. In this example a look-up-table may comprise a mapping between pump voltages and cleaning fluid flow rates. In another example, changing the parameter may comprise consulting a calibration curve and determining, from the calibration curve, a new value of the parameter. In another example, changing the parameter may comprise incrementally adjusting the flow rate over a period of time. In one example changing a parameter of a component of the print apparatus may comprise changing a flow impedance of a flow system (e.g. by adjusting a metering valve). For example, changing a parameter of a component of the print apparatus may comprise changing a flow impedance of a pump (e.g. by adjusting a metering valve).

Calibrating the cleaning fluid flow rate, at block 220, may comprise calibrating a cleaning fluid pump. This may comprise collecting historical calibration data of the pump and/or monitoring trends in the flow rate so that the pump may be calibrated in a closed-loop manner. The flow rate from the cleaning fluid pump may need a time interval $T1$ in order for the flow rate of cleaning fluid issuing therefrom to stabilise. Block 220 may comprise defining the time interval $T1$ to be the average of the most-recent flow readings, e.g. if successive flow samples have deviated less than a specific threshold (for example if successive flow samples are within the tolerance of the desired value).

In one example, comparing the determined cleaning fluid flow rate to a desired flow rate may comprise comparing a plurality of flow rates to the desired flow rate; and, when the number of instances that the determined cleaning fluid flow rates are outside of the tolerance of the desired flow rate is greater than a first threshold, comparing the determined cleaning fluid flow rate to a first range of flow rates; and, when the flow rate is inside of the first range of flow rates, changing a parameter of a component of the printing apparatus, in real-time, to cause the cleaning fluid flow rate to approach the desired flow rate, and, otherwise changing a parameter of a component of the printing apparatus during a pause or a stop in a print operation to cause the cleaning fluid flow rate to approach the desired flow rate.

Accordingly, the method 200, in one example, may comprise comparing a plurality of flow rates to the desired flow rate. In this example, blocks 204-208 may be repeated for a plurality of flow rates and, block 210 may be performed if the number of flow rates that are outside of the tolerance are above a first threshold. The first threshold may therefore represent a minimum number of samples over which the method may proceed to block 212. In other words, the method may proceed to blocks 210 and 212 when the number of sampled flow rates that are outside the tolerance exceed a minimum number. The method may, at block 212, comprise determining whether the number of flow rates that are inside of the first range of flow rates have exceeded a second threshold. The second threshold may therefore represent a minimum number of samples over which the method may proceed to block 216. In other words, the method may proceed to blocks 216 and 218 when the number of sampled flow rates that are outside of the first range of flow rates (e.g. not within or inside of the first range) exceed a minimum number. The method may, at block 218, comprise determining whether the number of flow rates that are outside of the second range of flow rates have exceeded a third threshold. The third threshold may therefore represent a minimum number of samples over which the method may proceed to block 222. In other words, the method may proceed to block 222 when the number of sampled flow rates that are outside of the second range (e.g. not within the second range) of flow rates exceed a minimum number. The first, second and third thresholds may be the same, for example the minimum number of samples may be the same in each case. In one example, the thresholds may all be 3, for example the minimum number of samples is three. Accordingly, the measured flow rates may exhibit some stability over time before the method comprises subsequent blocks in which a corrective action to the flow rate may be taken. This example may act to at least partially filter out noise in that further blocks of the method may be performed if a predetermined number of sequential 'out-of-range' flow rates are logged, e.g. within a time interval. In such examples, corrective action may be taken to the flow rate when a number of out of range events are logged.

In one example a plurality of flow rates may be averaged before the method may proceed. For example, the mean or median of a plurality of samples may be determined, and this value (e.g. mean or median) may be compared to at least one of the threshold, first range, and second range. In one example successive determined flow rates may be reduced to enable a comparison with the threshold and/or ranges. For example, individual successive determined flow rates may be compared to at least one of the threshold, first and second ranges, and when successive samples are above a predetermined number the method may comprise a corrective action or further comparison.

In one example at least one range of flow rates may not contain the desired flow rate.

In one example, the cleaning fluid flow rate may be continuously sampled/measured, e.g. by at least one sensor. For example, the cleaning fluid flow rate may be sampled at predetermined intervals. In one example the cleaning fluid flow rate may be sampled at last one of: during a print operation, during pause in a print operation, and during a 'GetReady' sequence.

Block 220 may comprise issuing an alert (e.g. to a user or operator) to indicate the severity of the flow rate. In one example block 220 may comprise changing the state of a print operation, for example from 'PRINT' to 'READY' or 'STANDBY'. In one example block 220 may comprise issuing a recommended course of action to an operator, for example issuing an instruction that recommends troubleshooting.

In one example, changing a parameter of a component of the print apparatus to affect the flow rate may comprise changing at least one parameter of at least one component of a print apparatus, or changing a plurality of parameters of a component of a print apparatus, or changing a parameter of a plurality of components of print apparatus.

Figure 3:
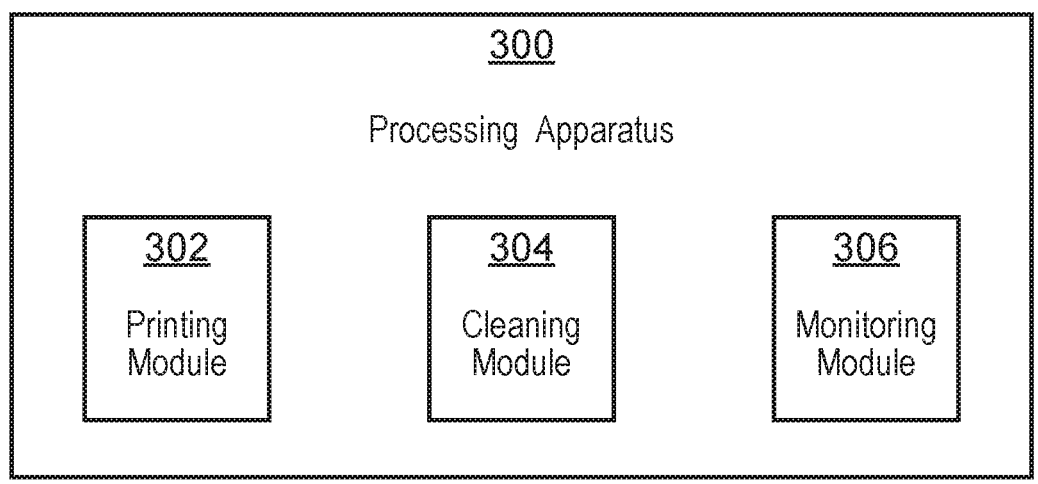
FIG. 3 is an example apparatus.

FIG. 3 is an example of an apparatus 300 comprising a printing module 302, a cleaning module 304, and a monitoring module 306. The printing module 302 is to print an image onto a printable medium. The cleaning module 304 is to supply cleaning fluid to at least part of the printing module 302 to clean the printing module 302. The monitoring module 306 is to monitor and determine the flow rate of a cleaning fluid through the cleaning module 304 and to compare the cleaning fluid flow rate to a desired flow rate; and, when the cleaning fluid flow rate is outside of a tolerance of the desired flow rate, to compare the flow rate to a first range of flow rates; and, when the flow rate is inside of the first range of flow rates, to change a parameter of a component of a printing apparatus in real-time to cause the cleaning fluid flow rate to approach the desired flow rate, and otherwise to change a parameter of a component of a printing apparatus during a pause in a print operation to cause the cleaning fluid flow rate to approach the desired flow rate.

The monitoring module 306, in one example, may be to, when the flow rate is outside of the first range of flow rates, compare the determined flow rate to a second range of flow rates, the first range of flow rates being a subset of the second range of flow rates, and, when the flow rate is outside of the second range of flow rates, stop a print operation.

Accordingly, in one example, the apparatus 300 may be to pause or stop the print operation, and/or to issue an alert. The apparatus 300, in one example, may be to perform a correction to the flow rate in real-time, e.g. on-the-fly, for example during a print operation.

In one example, the apparatus 300 may comprise a pump to supply cleaning fluid to the cleaning module.

In one example, the pump may meter cleaning fluid to the cleaning module via a heat exchanger and at least one sensor to measure the cleaning fluid flow rate. In one example, the cleaning module may supply cleaning fluid to a photoreceptor to clean and cool the photoreceptor.

In one example the cleaning module may be operatively connected to at least one sensor for measuring the cleaning fluid flow rate, e.g. a flow meter, and a heat exchanger for changing the temperature of the cleaning fluid.

The apparatus 300 of the example of FIG. 3 may perform the method 100 or 200 as set out in FIGS. 1 and 2, respectively.

Figure 4:
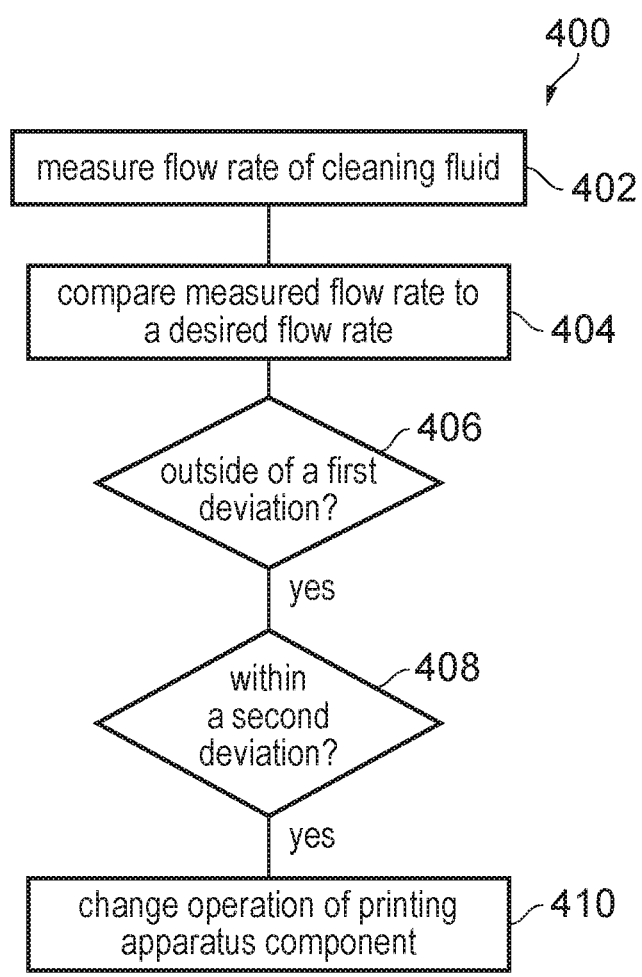
FIG. 4 is a flowchart of an example method.

FIG. 4 is an example method 400, which may be a computer implemented method, and may be a method for adjusting (or correcting) the flow rate of a cleaning fluid in a print apparatus, or a method for monitoring the flow rate of a cleaning fluid in a print apparatus. Method 400 may be performed during a print operation. Method 400 may be carried out using at least one processor.

In block 402, the flow rate of a cleaning fluid to clean at least a portion of a printing apparatus is measured.

In block 404, the measured flow rate is compared to a desired flow rate.

In block 406, it is determined whether the measured flow rate is outside a first deviation from a desired flow rate. If the measured flow rate is outside the first deviation then, at block 408, it is determined whether the measured flow rate is within a second deviation from the desired flow rate. If the measured flow rate is within the second deviation then, at block 410, the method 400 comprises changing the operation of a component of a printing apparatus.

The component of a printing apparatus may be a cleaning fluid pump and block 410 may comprise changing the voltage or current of the cleaning fluid pump to affect the flow rate of cleaning fluid.

Changing the operation of a component of a print apparatus, in block 410, may comprise changing the operation of a component of a print apparatus to affect the cleaning fluid flow rate, e.g. to cause the cleaning fluid flow rate to approach the desired flow rate. In one example, block 410 is performed in real-time during a print operation.

The first deviation may therefore indicate a "small" deviation which may be corrected for during real-time.

In one example, the desired rate of flow may be a nominal target flow rate.

In one example, the desired value may be 8 L/min.

In one example, the first deviation may be ±0.4 L/min from the desired value, e.g. 8 L/min. In this example, if the measured flow rate is determined to be between (or, in one example, between or equal to) 7.6 and 8.4 L/min then it may be determined that the measured flow rate is within the first deviation. Such flow rates may not be corrected as they are measured to be within a range of acceptable flow rates. If it is determined that the flow rate is less than (or, in one example, less than or equal to) 7.6 L/min, or greater than (or, in one example greater than or equal to) 8.4 L/min then it may be determined that the flow rate is outside of the first deviation. Such deviations may be corrected for, in real-time, during a print operation by changing the operation of a component of a printing apparatus.

In one example, the second deviation may be −0.5 and +0.6 L/min from the desired flow rate, e.g. 8 L/min. In this example a flow rate of less than (or less than or equal to) 7.5 L/min, or greater than (or greater than or equal to) 8.6 L/min is outside of the second deviation, etc. In another example, the second deviation may be ±2 L/min from the desired flow rate, e.g. 8 L/min. In this example a flow rate outside of the range (6, 10) L/min or, in one example, [6, 10] L/min it outside of the second deviation. Such deviations may be corrected for during a pause in a print operation by changing the operation of a component of a printing apparatus.

Figure 5:
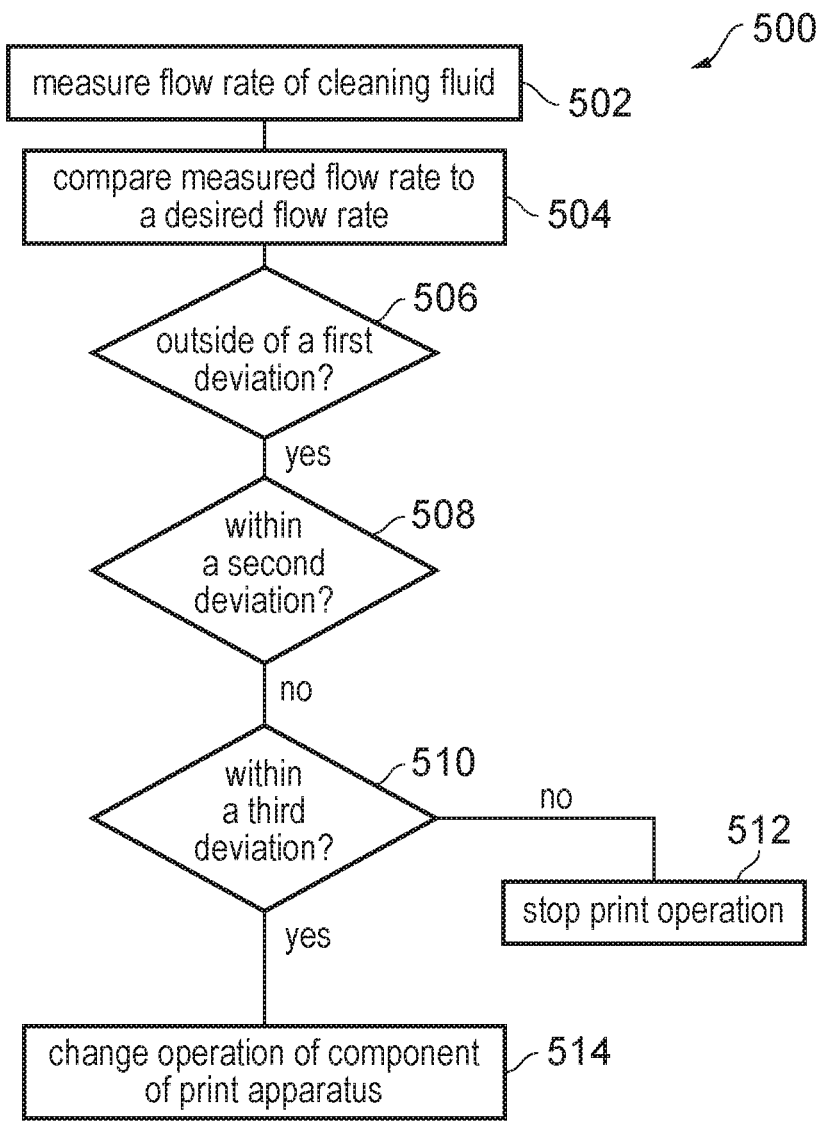
FIG. 5 is a flowchart of an example method.

FIG. 5 is an example method 500, which may be a computer implemented method, and may be a method for adjusting (or correcting) the flow rate of a cleaning fluid in a print apparatus, or a method for monitoring the flow rate of a cleaning fluid in a print apparatus. Method 500 may be performed during a print operation. Method 500 may be carried out using at least one processor.

Blocks 502-508 of the method 500 are as for the method 400 in the example above of FIG. 4.

In block 510, if at block 508 it is determined that the flow rate is outside of (e.g. not within) a second deviation then, at block 510, it is determined whether the measured flow rate is within a third deviation from a desired flow rate. If it is determined that the flow rate is outside of the third deviation then the method comprises, at block 512, stopping the print operation. The third deviation may therefore represent a "large" deviation for which a print operation should stop and no attempt to correct the flow rate is made. If it is determined that the flow rate is not within (e.g. is outside) of the third deviation then the method may comprise, at block 512, issuing an alert, for example issuing a request for manual correction, e.g. a request to a user to manually correct the flow rate. A deviation from a desired flow rate that is outside of the third deviation may be considered to be a catastrophic event and manual feedback may guide repair. The cause of such a deviation may be unknown. Accordingly, in one example block 512 may comprise issuing a recommendation to a user to perform diagnostic tests. In one example, block 512 may comprise automatically performing at least one diagnostic test. In such examples, any results of diagnostic testing may be automatically communicated to a user. If it is determined that the flow rate is within the third deviation then the method comprises, at block 514, changing the operation of a component of a printing apparatus during a pause in the print operation. Such deviations (not within the second deviation but within the third deviation) may be considered "medium" and may be corrected for during a pause in the print operation so that a correction does not adversely affect the print operation.

At least one of the first, second, and third deviations may be asymmetrical about the desired flow rate.

In one example, the desired rate of flow may be a nominal target flow rate.

In one example, the desired value may be 8 L/min.

In one example, the first deviation may be ±0.4 L/min from the desired value, e.g. 8 L/min. In this example, if the measured flow rate is determined to be between (or, in one example, between or equal to) 7.6 and 8.4 L/min then it may be determined that the measured flow rate is within the first deviation. Such flow rates may not be corrected as they are measured to be within a range of acceptable flow rates. If it is determined that the flow rate is less than (or, in one example, less than or equal to) 7.6 L/min, or greater than (or, in one example greater than or equal to) 8.4 L/min then it may be determined that the flow rate is outside of the first deviation. Such deviations may be corrected for, in real-time, during a print operation by changing the operation of a component of a printing apparatus.

In one example, the second deviation may be −0.5 and +0.6 L/min from the desired flow rate, e.g. 8 L/min. In this example a flow rate of less than (or less than or equal to) 7.5 L/min, or greater than (or greater than or equal to) 8.6 L/min is outside of the second deviation, etc. In another example, the second deviation may be ±2 L/min from the desired flow rate, e.g. 8 L/min. In this example a flow rate outside of the range (6, 10) L/min or, in one example, [6, 10] L/min it outside of the second deviation. Such deviations may be corrected for during a pause in a print operation by changing the operation of a component of a printing apparatus.

In one example the third deviation may be ±2.1 from the desired flow rate. In this example a flow rate outside of the range (5.9, 10.1) L/min or, in one example, [5.9, 10.1] L/min is outside of the third deviation. Such deviations may be corrected for during a stop in a print operation by changing the operation of a component of a printing apparatus.

In some examples, the flow rate may be checked against further deviations, e.g. fourth, fifth deviation etc.

In one example a tangible (and non-transitory) machine readable medium may be in associated with a processor. The tangible machine readable medium may comprise instructions which, when executed by the processor, may cause the processor to carry out a plurality of tasks.

In one example, the instructions may comprise instructions to cause the processor to: measure the flow rate of a cleaning fluid to clean at least a portion of a printing apparatus; and compare the measured flow rate to a desired flow rate; and, when the measured flow rate is outside of a first deviation from the desired flow rate, but within a second deviation from the desired flow rate, change the operation of a component of a printing apparatus. In one example, the instructions may comprise instructions to cause the processor to: when the measured flow rate is outside of the second deviation from the desired flow rate, compare the measured flow rate to a third deviation from the desired flow rate; and, when the measured flow rate is outside of the third deviation from the desired flow rate, stop a print operation, and, otherwise, change the operation of a component of a print apparatus.

In one example, the processor and/or the instructions may be provided on a server device, for example a cloud device. In one example the processor and/or the instructions may be provided on a hardware device.

The machine readable medium of may comprise instructions to perform any, or any combination, of the blocks of methods 100, 200, 400 or 500 as set out in FIG. 1, 2, 4 or 5, respectively.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
receiving data indicative of cleaning fluid flow at a printing apparatus;
determining, from the received data, a cleaning fluid flow rate;
comparing the determined cleaning fluid flow rate to a desired flow rate; and, when the cleaning fluid flow rate is outside of a tolerance of the desired flow rate, comparing the determined cleaning fluid flow rate to a first range of flow rates; and, when the flow rate is inside of the first range of flow rates, changing a parameter of a component of the printing apparatus, in real-time, to cause the cleaning fluid flow rate to approach the desired flow rate, and, otherwise changing a parameter of a component of the printing apparatus during a pause or a stop in a print operation to cause the cleaning fluid flow rate to approach the desired flow rate.

2. A method as claimed in claim 1, wherein changing a parameter of a component of the printing apparatus, in real-time, is to cause the cleaning fluid flow rate to be within the tolerance of the desired flow rate.

3. A method as claimed in claim 1, wherein, when the flow rate is outside of the first range of flow rates, further comprising:
comparing the determined flow rate to a second range of flow rates, the first range of flow rates being a subset of the second range of flow rates, and, when the flow rate is outside of the second range of flow rates, stopping a print operation.

4. A method as claimed in claim 3, wherein changing a parameter of a component of the printing apparatus in a print operation to cause the cleaning fluid flow rate to approach the desired flow rate comprises changing a parameter of a component of the printing apparatus during a stop of the print operation.

5. A method as claimed in claim 3, further comprising, when the determined flow rate is inside of the second range of flow rates, calibrating the cleaning fluid flow rate during a pause in the print operation.

6. A method as claimed in claim 5, wherein calibrating the cleaning fluid flow rate comprises calibrating a cleaning fluid pump.

7. A method as claimed in claim 1 wherein a pump is to supply the cleaning fluid at a flow rate, and wherein changing a parameter of a component of the printing apparatus, in real-time, to cause the cleaning fluid flow rate to approach the desired flow rate comprises changing at least one of: voltage through the pump; current through the pump; electrical power suppled to the pump; the frequency of the pump; and the flow impedance of cleaning fluid.

8. A method as claimed in claim 1 wherein changing a parameter of a component of the printing apparatus comprises determining, using a look-up table, a new parameter value and setting the parameter to the new value.

9. A method as claimed in claim 1, wherein comparing the determined cleaning fluid flow rate to a desired flow rate comprises comparing a plurality of flow rates to the desired flow rate; and, when the number of instances that the determined cleaning fluid flow rates are outside of the tolerance of the desired flow rate is greater than a first threshold, comparing the determined cleaning fluid flow rate to a first range of flow rates; and, when the flow rate is inside of the first range of flow rates, changing a parameter of a component of the printing apparatus, in real-time, to cause the cleaning fluid flow rate to approach the desired flow rate, and, otherwise changing a parameter of a component of the printing apparatus during a pause or a stop in a print operation to cause the cleaning fluid flow rate to approach the desired flow rate.

10. Processing apparatus comprising:
   a printing module to print an image onto a printable medium;
   a cleaning module to supply cleaning fluid to least part of the printing module to clean the printing module;
   a monitoring module to monitor and determine the flow rate of a cleaning fluid through the cleaning module and to compare the cleaning fluid flow rate to a desired flow rate; and, when the cleaning fluid flow rate is outside of a tolerance of the desired flow rate, to compare the flow rate to a first range of flow rates; and, when the flow rate is inside of the first range of flow rates, to change a parameter of a component of a printing apparatus in real-time to cause the cleaning fluid flow rate to approach the desired flow rate, and otherwise to change a parameter of a component of a printing apparatus during a pause or a stop in a print operation to cause the cleaning fluid flow rate to approach the desired flow rate.

11. Processing apparatus as claimed in claim 10 comprising:
   a pump to supply cleaning fluid to the cleaning module.

* * * * *